(12) United States Patent
Lee

(10) Patent No.: US 12,339,483 B1
(45) Date of Patent: Jun. 24, 2025

(54) DEVICES AND METHODS FOR PROVIDING A CONDUIT FOR LIGHT TO TRAVEL BETWEEN AN OPTICAL FIBER AND A PHOTODIODE

(71) Applicant: Keysight Technologies, Inc., Santa Rosa, CA (US)

(72) Inventor: Gregory Steven Lee, Mountain View, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/750,026

(22) Filed: Jun. 21, 2024

(51) Int. Cl.
   *F21V 8/00* (2006.01)
(52) U.S. Cl.
   CPC ......... *G02B 6/0028* (2013.01); *G02B 6/0006* (2013.01)
(58) Field of Classification Search
   CPC .......................... G02B 6/0028; G02B 6/0006
   See application file for complete search history.

(56) References Cited

U.S. PATENT DOCUMENTS

| | | |
|---|---|---|
| 10,012,806 B2 | 7/2018 | de Jong et al. |
| 10,809,468 B2 | 10/2020 | Houbertz et al. |
| 2019/0278018 A1* | 9/2019 | Angelini ............. G02B 6/0008 |

OTHER PUBLICATIONS

"0.200 NA Graded-Index Multimode Fiber", ThorLabs (Feb. 6, 2024).
Trappen, Mareike, et al. "3D-printed optics for wafer-scale probing." 2018 European Conference on Optical Communication (ECOC). IEEE, 2018.

* cited by examiner

*Primary Examiner* — Anne M Hines
*Assistant Examiner* — Jose M Diaz

(57) ABSTRACT

A system for providing a conduit for light to travel between an optical fiber and a photodiode includes a tapered light coupler. A first portion of the tapered light coupler is configured to receive light from at least one optical fiber and includes a tapered region that is tapered toward a tapered end. A second portion of the tapered light coupler is coupled to and extending from the tapered end of the first portion at a junction forming an ordinary angle. The second portion includes a tapered region that is tapered toward a distal end and is configured to transfer light from the distal end to a photodiode that has a smaller surface area than a cross sectional area of the at least one optical fiber. The tapered light coupler includes a slanted surface at an exterior of the junction.

20 Claims, 8 Drawing Sheets

DEVICES AND METHODS FOR PROVIDING A CONDUIT FOR LIGHT TO TRAVEL BETWEEN AN OPTICAL FIBER AND A PHOTODIODE

TECHNICAL FIELD

The subject matter described herein relates to light coupling. More specifically, the subject matter relates to devices and methods for providing a conduit for light to travel between an optical fiber and a photodiode.

BACKGROUND

Data centers heavily rely on multimode fiber (MMF) to transmit data between processors as the transmitters supporting MMF signaling is much less expensive than the photonic infrastructure needed for single mode fiber (SMF) transmission. The exploding popularity and application of artificial intelligence (AI) in almost all facets of modern life are straining data centers, forcing bandwidth upgrades reminiscent of Moore's Law. On the other hand, unless optical efficiency is upheld or even improved, global data center energy consumption will soon be a major contributor aggravating climate change. For example, it is forecasted that the worldwide data center electricity consumption may reach 1 petawatt-hour (1e15 watt-hours) by 2026.

Higher MMF data rate with no loss in or even improved optical efficiency is needed. MMF-photodiode bandwidths of 56-60 GHz are vital to testing 2024-2025 "bleeding edge" components and systems. The subsequent generation will likely double the MMF-photodiode bandwidths to 112-120 GHz and simultaneously demand vertical-cavity surface-emitting lasers (VCSELs) to cut their power to half of what they presently use.

Of today's photodiodes that are compatible with multimode fiber, the highest available bandwidth is only about 30 GHz. The reason for this is that the optical coupling is based on lensing, but the refractive index of glass and polymers is too low to achieve a demagnification factor of more than about 2×. Modern MMF core diameter is 50 microns, implying the photodiode diameter is 25 microns or more. This leads to excessive photodiode capacitance and consequently a large resistance-capacitance (RC) time constant, the load resistance R typically being 50 ohms. Transimpedance amplifiers (TIA's) can lower the effective load resistance only slightly.

At the longer wavelengths used in SMF technology, e.g., 1310 and 1550 nm, one can exploit the high refractive index of the indium phosphide (InP) substrate itself used in photodiode manufacturing and get very high demagnification with backside-of-substrate microlenses, but this is not an option in MMF because the shorter multimode wavelengths, e.g., 850 and 980 nm, are strongly absorbed by InP.

Gallium phosphide (GaP) has a large enough bandgap to be transparent to the multimode wavelengths, but the photodiode must be fabricated based on InP technology. One could imagine a hybrid solution consisting of a GaP lens and an InP photodiode, but this involves very difficult and expensive processes, namely perfecting the etching of the GaP lens and, even more challenging, transferring the InP mesa stack onto the GaP substrate.

Silicon carbide (SiC) microlenses with sufficiently high bandgap have been made, but the existing coarse polyhedral shapes need to approach more perfect ellipsoids and/or hyperboloids (depending on single vs. compound lensing) for good optical performance. Even if SiC microfabrication improves, it is far from clear whether this is a cost-effective strategy.

It can be appreciated therefore that a relative low cost, but highly efficient means of coupling light from a multimode fiber to a small diameter (hence fast) photodiode is needed.

SUMMARY

Devices and methods for providing a conduit for light to travel between an optical fiber and a photodiode are disclosed. An example device for providing a conduit for light to travel between an optical fiber and a photodiode includes a tapered light coupler including a first portion configured to receive light from at least one optical fiber, the first portion including a tapered region that is tapered toward a tapered end. The tapered light coupler further includes a second portion coupled to and extending from the tapered end of the first portion at a junction forming an ordinary angle, the second portion including a tapered region that is tapered toward a distal end, the second portion configured to transfer light to a photodiode from the distal end, wherein the photodiode comprises a smaller surface area than a cross sectional area of the at least one optical fiber. The tapered light coupler further includes a slanted surface at an exterior of the junction.

According to another aspect of the device described, the ordinary angle is about 90°.

According to another aspect of the device described, the ordinary angle is an obtuse angle within a range to about 100°.

According to another aspect of the device described, the slanted surface is a chamfer plane.

According to another aspect of the device described, the chamfer plane is a chamfer plane of a torus.

According to another aspect of the device described, the slanted surface is a fillet.

According to another aspect of the device described, the tapered regions of the first and second portions are conical frusta.

According to another aspect of the device described, the at least one optical fiber comprises a multimode fiber.

According to another aspect of the device described, the tapered regions of the first and second portions and the slanted surface provide approximately total internal reflection for light received from the at least one optical fiber.

According to another aspect of the device described, the first portion is coupled to the at least one optical fiber and the second portion is coupled to the photodiode.

An example method for providing a conduit for light to travel between an optical fiber and a photodiode includes providing a tapered light coupler between at least one optical fiber and a photodiode. The tapered light coupler includes a first portion configured to receive light from the at least one optical fiber, the first portion including a tapered region that is tapered toward a tapered end. The tapered light coupler further includes a second portion coupled to and extending from the tapered end of the first portion at a junction forming an ordinary angle, the second portion including a tapered region that is tapered toward a distal end, the second portion configured to transfer light to the photodiode from the distal end, wherein the photodiode comprises a smaller surface area than a cross sectional area of the at least one optical fiber. The tapered light coupler further includes a slanted surface at an exterior of the junction. The method further includes receiving, at the first portion, light from the at least one optical fiber. The method further includes internally reflecting, by the tapered regions of the first and second portions and the slanted surface, the received light. The method further includes transferring, at the distal end of the second portion, the received light to the photodiode.

According to another aspect of the device described, the ordinary angle is about 90°.

According to another aspect of the device described, the ordinary angle is an obtuse angle within a range to about 100°.

According to another aspect of the device described, the slanted surface is a chamfer plane.

According to another aspect of the device described, the chamfer plane is a chamfer plane of a torus.

According to another aspect of the device described, the slanted surface is a fillet.

According to another aspect of the device described, the tapered regions of the first and second portions are conical frusta.

According to another aspect of the device described, the at least one optical fiber comprises a multimode fiber.

According to another aspect of the device described, the tapered regions of the first and second portions and the slanted surface provide approximately total internal reflection for light received from the at least one optical fiber.

According to another aspect of the device described, the first portion is coupled to the at least one optical fiber and the second portion is coupled to the photodiode.

BRIEF DESCRIPTION OF THE DRAWINGS

The subject matter described herein will now be explained with reference to the accompanying drawings of which.

DETAILED DESCRIPTION

The subject matter described herein includes devices and methods for providing a tapered light coupler as a conduit for light to travel between an optical fiber, such as an MMF, and a photodiode. The tapered light coupler includes a first portion running parallel to and aligned with an end of a fiber core in the optical fiber. The first portion receives light from the optical fiber and the light travels down the first portion to a junction where a second portion that is angled toward a coupled photodiode meets the first portion. The first portion and second portion form an angle at the junction that can be 90° or greater, for example 100°. At an external side of the junction is a slanted surface, which redirects the light traveling through the first portion down the connecting second portion to the photodiode. The first and second portions include conical frusta that concentrate and demagnify the light. For example, the receiving coupled to the optical fiber can have a diameter of about 50 or 55 microns while the end coupled to the photodiode can have a diameter of about 10 microns. The shape of the first and second portions and the slanted surface provide TIR of the received light.

Figure 1:
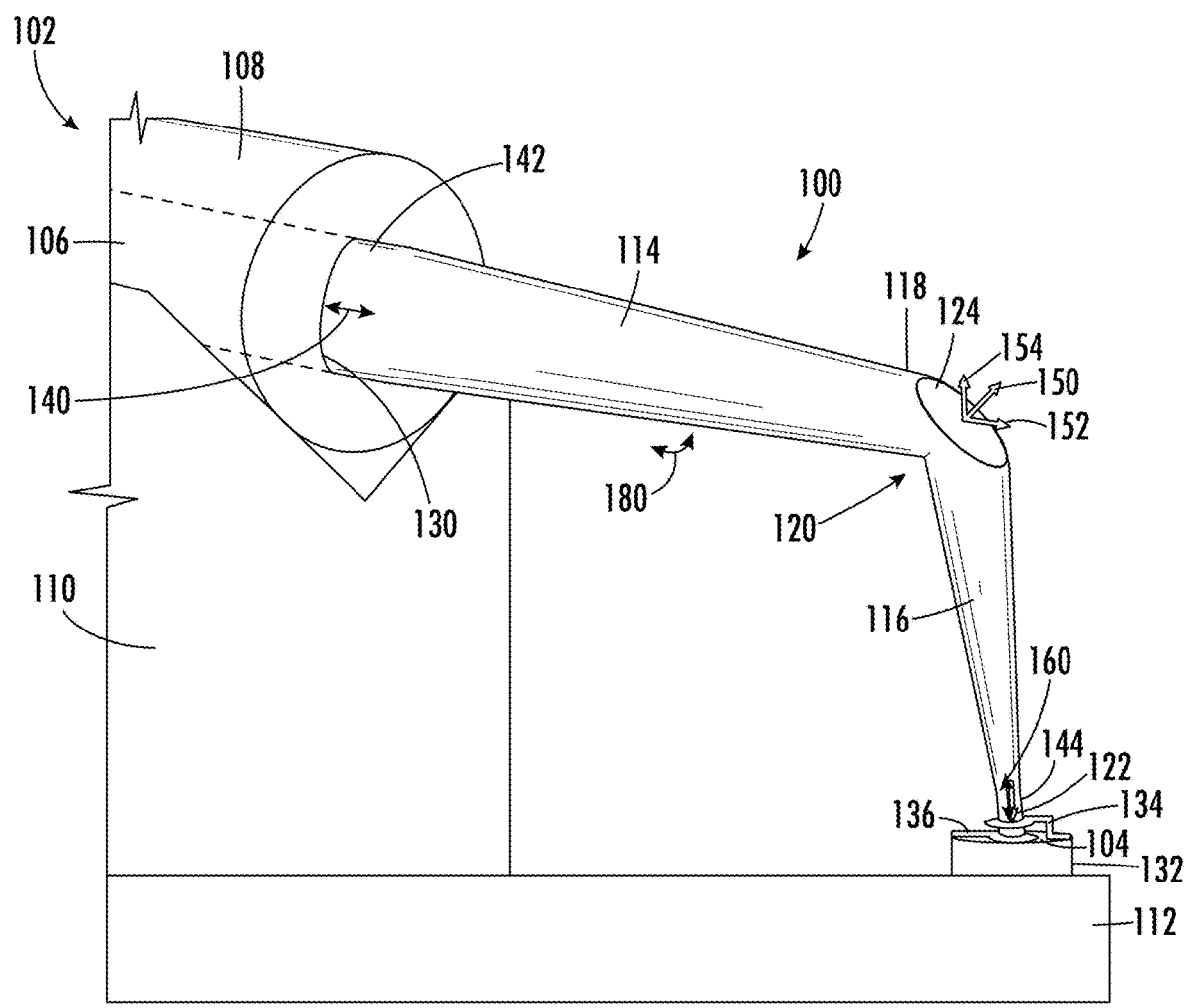
FIG. 1 is a perspective view of a tapered light coupler for light to travel between an optical fiber and a photodiode.
Figure 2:
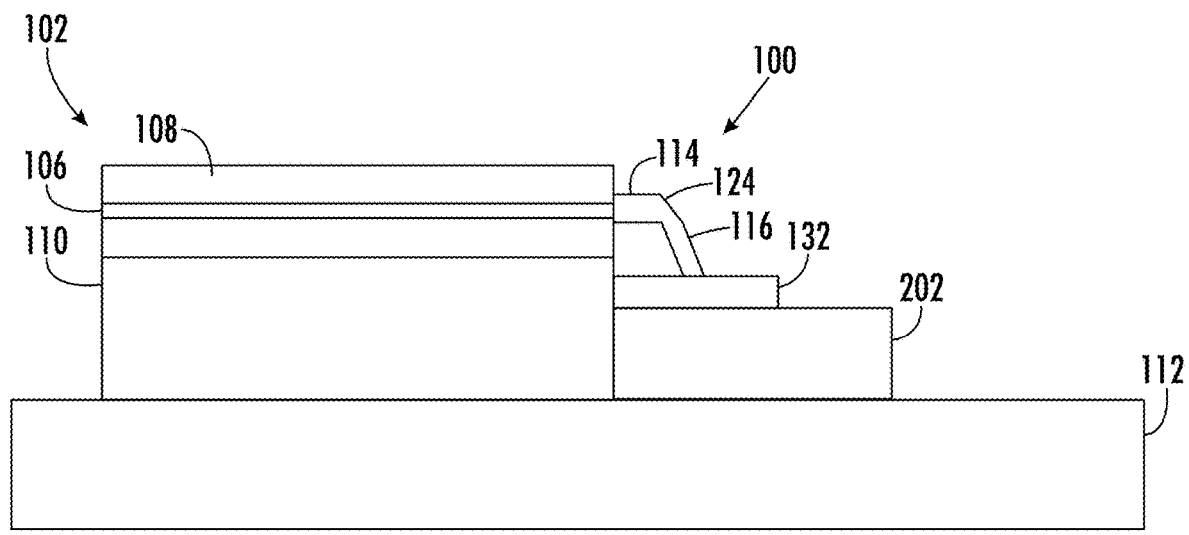
FIG. 2 is a side view of a tapered light coupler for light to travel between an optical fiber and a photodiode.

FIG. 1 and FIG. 2 show a side view and perspective view, respectively, of a tapered light coupler 100 between an optical fiber 102 and a photodiode 104. It should be understood that the features shown in FIG. 1 are not to scale. Tapered light coupler 100 provides a conduit for light to travel between optical fiber 102 and photodiode 104. Optical fiber 102 can include a fiber core 106 housed in a cladding 108. Fiber core 106 can include at least one multimode fiber or single mode fiber. An end of optical fiber 102 runs parallel with a surface of photodiode 104 and is generally secured in place and spaced vertically from the photodiode 104 by a supporting structure, such as a V-groove substrate 110, that provides an accurate placement of the optical fiber 102. V-groove substrate 110 and photodiode 104 both sit on a carrier substrate 112 for further excellent co-registration and are horizontally spaced from each other. V-groove substrate 110 and optical fiber 102 run parallel to the surface of carrier substrate 112. The end surface of optical fiber 102 from which tapered light coupler 100 receives light is perpendicular or substantially perpendicular to a top surface of photodiode 104, requiring the light from the optical fiber 102 to be redirected toward the top surface of the photodiode 104. The orientation of optical fiber 102 relative to photodiode 104 is due to manufacturing and cost limitations. It would be difficult to mount photodiode 104 on its edge. It would also be difficult to mount V-groove substrate 110 vertically and extremely difficult to 3D print a light coupling element in such a configuration to transmit light between optical fiber 102 and photodiode 104.

Tapered light coupler 100 implements, rather than imaging optics such as lensing, "light pipe" guiding and concentration by exploiting total internal reflection (TIR) offered by the refractive index contrast between the polymer of the tapered light coupler 100 and ambient air. For example, ultraviolet (UV)-curable SU-8 and similar polymers have refractive indices in the 1.52-1.55 range at near infrared wavelengths. For a refractive index of 1.53, the critical angle, which is the smallest angle relative to normal incidence at which TIR is achieved, is 40.8°. Keeping track of the light rays exiting optical fiber 102 and being mindful of the critical angle, a judicious blend of tapering and bending the polymer of tapered light coupler 100 can transfer nearly all the light received from optical fiber 102 to photodiode 104.

Tapered light coupler 100 includes a first portion 114 that is coupled to optical fiber 102, specifically fiber core 106, at a receiving end 130 of the first portion 114. Tapered light coupler 100 includes a second portion 116 coupled to photodiode 104 at a distal end 122 of the second portion 116. First portion 114 is configured to receive light from optical fiber 102 at receiving end 130. First portion 114 includes a tapered region that is tapered toward a tapered end 118 away from optical fiber 102 such that a cross sectional area of the first portion 114 at receiving end 130 is larger than a cross sectional area of the first portion 114 at the tapered end 118. The cross sectional area of receiving end 130 can match or slightly exceed in size and align with the cross sectional area of fiber core 106. First portion 114 can be tapered along an entire length of the first portion 114 from receiving end 130 to tapered end 118. In another aspect of the described subject matter, first portion 114 can include a tapered region that extends to less than the entire length of first portion 114, such as a tapered region that extends to only one of receiving end 130 or tapered end 118 or neither. The tapered regions of first portion 114 and/or second portion 116 can be conical frusta. In other aspect of the described subject matter, the tapered regions of first portion 114 and/or second portion 116 can be frustra with flat sides, such as truncated pyramids.

Second portion 116 is coupled to and extends from tapered end 118 of first portion 114 at a junction 120 forming an ordinary angle, namely an angle less than 180°. Second portion 116 includes a tapered region that is tapered from junction 120 toward a distal end 122 such that a cross sectional area at the junction 120 is larger than a cross sectional area at the distal end 122. The cross sectional areas of first portion 114 and second portion 116 can match in size and align with each other at junction 120. Second portion 116 can be tapered along an entire length of the second portion 116 from junction 120 to distal end 122. In another aspect of the described subject matter, second portion 116 can include a tapered region that extends to less than the entire length of second portion 116, such as a tapered region that extends to only one of junction 120 or distal end 122 or neither.

The tapered regions of first and second portions 114, 116 demagnify the light received from optical fiber 102. Tapered light coupler 100 could provide a demagnification factor of about 25× or even greater. For example, a cross sectional diameter of fiber core 106 and receiving end 130 can be about 50 microns and a cross sectional diameter of distal end 122 can be about 10 microns.

The ordinary angle at junction 120 formed by first portion 114 and second portion 116 can be about 90°. Second portion 116 need not be perfectly vertical. In fact, tilting second portion 116 so that the angle at junction 120 is slightly obtuse offers two advantages: (a) more of the light incident upon the junction 120 enjoys TIR and (b) light reflecting off photodiode 104 will partially scatter into the air rather than return to optical fiber 102 and connecting light source, such as the VCSEL. In some aspects of the described subject matter, the ordinary angle can be obtuse, that is greater than 90°, up to and including about 100°. In other aspects of the described subject matter, the ordinary angle can be larger than 100°.

Figure 4B:
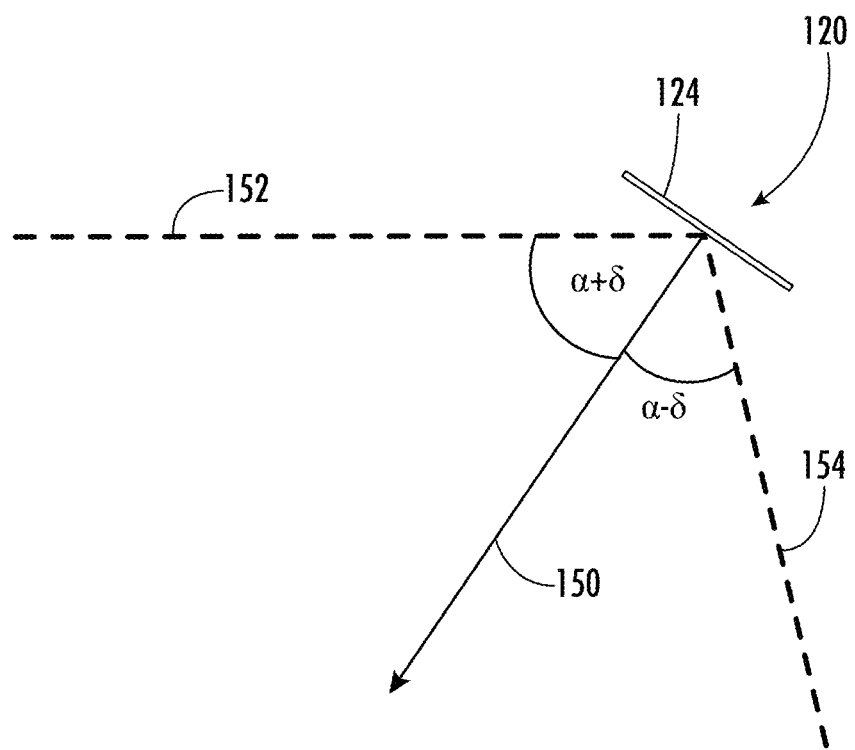
FIG. 4B shows another example orientation of a slanted surface.
Figure 5A:
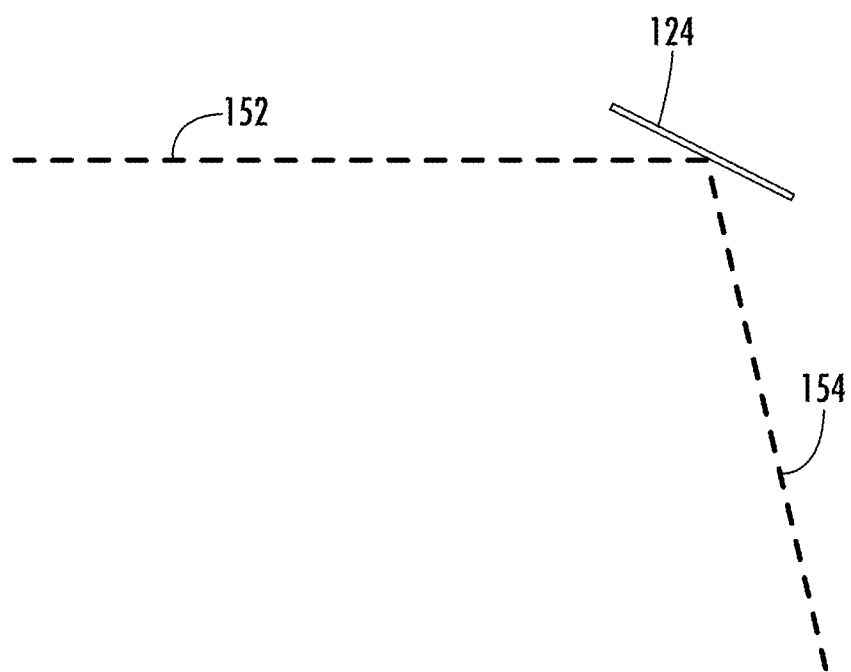
FIG. 5A shows an example position of a slanted surface.
Figure 5B:
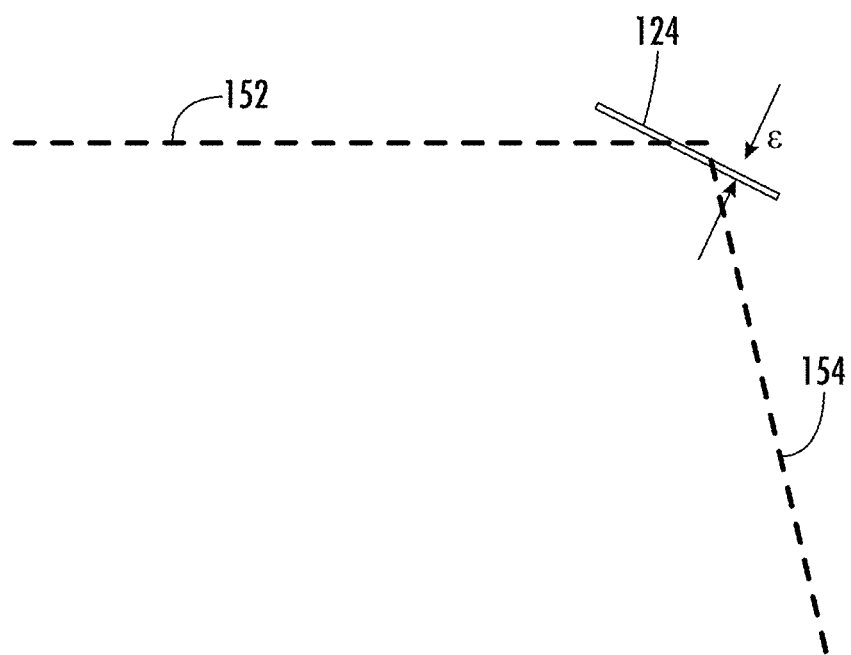
FIG. 5B shows another example position of a slanted surface.

Tapered light coupler 100 includes a slanted surface 124 at an exterior of junction 120. Slanted surface 124 provides for the light travelling parallel with the surface of photodiode 104 through first portion 114 to be redirected down second portion 116 and toward photodiode 104. Slanted surface 124 can be a chamfer plane with a planar surface. The chamfer plane can be a chamfer plane of a torus. The minor radius of the torus can match both tapered end 118 of first portion 114 and the radius of the large end of second portion 116 at junction 120. The major radius of the torus can be equal to or slightly larger than its minor radius. The slanted surface normal vector 150 can bisect the angle between first portion 114 and second portion 116. In other aspects and as shown in FIG. 4B, slanted surface 124 can be biased toward second portion axis 154 such that the angle formed by slanted surface normal vector 150 and first portion axis 152 is larger than the angle formed by the slanted surface normal vector 150 and the second portion axis 154. First portion axis 152 and second portion axis 154 can intersect at slanted surface 124, as shown in FIG. 5A. In some aspects of the described subject matter, first portion axis 152 and second portion axis 154 can intersect at a distance from slanted surface 124 where the slanted surface 124 to closer to an external side of junction 120, as shown in FIG. 5B.

In another aspect of the described subject matter, slanted surface 124 can be a fillet with a slightly curved or cylindrical surface, such as a convex surface, to round the edges formed between the slanted surface 124 and first and second portions 114, 116. The tapered regions of first and second portions 114, 116 and slanted surface 124 can provide approximately total internal reflection for light received from optical fiber 102.

Second portion 116 is configured to transfer light from distal end 122 to photodiode 104. Photodiode 104 is part of a photodiode chip 132, which can also include p-contact 134 and n-contact 136 electrodes. Photodiode 104 has a smaller surface area than a cross sectional area of optical fiber 102. For example, photodiode 104 can have an exposed cross sectional diameter of about 10 microns. In some aspects, the exposed cross sectional diameter of photodiode 104 can be smaller or larger than 10 microns.

Tapered light coupler 100 can be made of a polymer such as, and without limitation, photosensitive benzocyclobutene, photosensitized polymethyl methacrylate (i.e., photosensitized acrylic), photosensitized polyimide for infrared light, UV-curable SU-8, and VanCore by Vanguard® Automation. Tapered light coupler 100 can be manufactured using additive and/or subtractive manufacturing. For example, tapered light coupler 100 can be manufactured with 3D printing. In one aspect of the described subject matter, tapered light coupler 100 can be 3D printed in situ such that it is printed onto an end of optical fiber 102 and onto photodiode 104, which are both already coupled to carrier substrate 112. In another aspect of the described subject matter, tapered light coupler 100 can be 3D printed separately from optical fiber 102 and photodiode 104 and subsequently coupled to the optical fiber 102 and the photodiode 104.

Although very advanced 3D-printing UV machines are capable of micron or even submicron definition accuracy, mechanical packaging of V-groove substrate 110 and photodiode 104 endures much less stringent tolerances. Therefore, it is beneficial for tapered light coupler 100 to be designed to accommodate some adjustment degrees of freedom to accommodate variances with V-groove substrate 110 and photodiode 104.

In an example aspect of the described subject matter, a total vertical length of tapered light coupler 100 from receiving end 130 to the farther edge of distal end 122 can be 280±10 μm. Tapered light coupler 100 can have a vertical displacement from first portion axis 152 to distal end 122 of 160±15 μm, and first portion axis 152 can be vertically displaced from a top surface of a shim 202, as shown in FIG. 2, by 260±10 μm. The ±15 μm and ±10 μm are adjustable parameters 140 for lengths of first portion 114 and second portion 116, respectively, as described herein. As shown in FIG. 2, photodiode chip 132 (including photodiode 104) sits on top of shim 202 to elevate the photodiode chip 132 and make up for the vast difference in thickness between photodiode 104 and V-groove substrate 110. Fiber core 106 can be vertically displaced from a top surface of carrier substrate 112 by 730 μm. V-groove substate 110 can be a lidless fiber array with eight channels and a 250 μm pitch. V-groove substrate 110, photodiode chip 132 can include Borofloat 33 or another substrate material used in the field.

Three degrees of freedom are provided by adjustable parameters 140, 160, and 180 represented by the double arrows in FIG. 1. Adjustable parameters 140 indicate permissible adjustments to the dimensions and/or orientation to tapered light coupler 100 during the manufacturing process to accommodate potential variances with V-groove substrate 110 and photodiode 104. Adjustable parameter 140 at receiving end 130 of first portion 114 includes a hip 142 of the first portion 114 and allows the first portion 114 at the receiving end 130 to be longer or shorter based upon the horizontal distance from V-groove substrate 110 to photodiode 104. Adjustable parameter 160 at distal end 122 of second portion 116 includes an ankle 144 of the second portion 116 and allows the second portion 116 at the distal end 122 to be longer or shorter based upon the vertical distance from V-groove substrate 110 to photodiode 104. Hip 142 and ankle 144 can be cylindrical rather than conical frusta so the diameters of the cross sections at the ends of tapered light coupler 100, namely receiving end 130 that couples to fiber core 106 and distal end 122 that couples to photodiode 104, remain the same regardless of adjustments within the adjustable parameters 140 and 160, respectively. Hip 142 and ankle 144 are short in relation to the remaining length of the corresponding first portion 114 and second portion 116. Thus, the tapering benefits are still obtained.

It should be noted that when an obtuse angle is chosen at junction 120 between first portion axis 152 and second portion axis 154, lengthening or shortening ankle 144 also produces a slight longitudinal change in tapered light coupler 100 overall. In this case, vertical accommodation is a combination of ankle 144 adjustment and a slight hip 142 adjustment. It should also be noted that tilting second portion 116, followed by a horizontal plane slice at distal end 122 results in a slightly elliptical rather than purely circular surface at the distal end 122. In practice, however, this departure from circular is unnoticeable and inconsequential. For example, a 10° tilt (resulting in an obtuse angle of 100° at junction 120) impinging on an exposed photodiode 104 area nominally 10 microns in diameter results in an ellipse whose minor and major axes are 10 microns and 10.15 microns, respectively. The perimeter of a top-illuminated photodiode 104 is ringed with a "horseshoe" of contact metal (such as p-contact 134, as shown in FIG. 1). There is no advantage lost if the inside of the horseshoe, which is the exposed area of photodiode 104, is not perfectly circular. Furthermore, most top-illuminated photodiodes are still defined by older vintage photolithography which is unable to deliver 0.15-μm lithographic accuracy anyway.

The third degree of freedom provided by adjustable parameter 180 indicated in FIG. 1 is a twist rotation of tapered light coupler 100. This degree of freedom accommodates lateral misalignment between V-groove 110 and photodiode 104. Borrowing language from the aerospace industry, this third degree of freedom provides "roll" for first portion 114. Using "roll" to address lateral misalignment is advantageous over using "yaw" of first portion 114 because the latter would cause angular separation between the first portion axis 152 and the axis of optical fiber 102, resulting in a loss of TIR throughout tapered light coupler 100. Roll provided by adjustable parameter 180 avoids such separation. When roll is implemented for tapered light coupler 100, distal end 122 is then cut to form a plane that is parallel to photodiode 104.

Concomitant with the roll, ankle 144 should be slightly lengthened to maintain vertical distance between the optical fiber 102 axis and photodiode 104 top surface. In practice, this lengthening is quite small. For example, if the vertical distance is 160 μm and the lateral misalignment is 10 microns, the roll angle is about 3.6° and the requisite lengthening of ankle 144 is only about 0.3 microns. Once again, there is a slight elliptical distortion at distal end 120.

It is understood that lengths of first portion axis 152 and/or second portion axis 154 can be determined to accommodate alternative placements of optical fiber 102 and photodiode 104 on carrier substrate 112. For example, if an end of optical fiber 102 was positioned a horizontal distance of 300 μm from an exposed portion of photodiode 104 instead of 280 μm in the above example, then a total horizontal length of tapered light coupler 100 from receiving end 130 to the farther edge of distal end 122 can be 300 μm, instead of 280 μm, with adjustable parameter 140 of ±10 μm. If the vertical displacement in this example is the same as the above example, namely 160±10 μm from first portion axis 152 to the top surface of photodiode 104, then first portion 114 can be 20 μm longer, while the length of second portion 116 remains unchanged. As another example, if the vertical distance between the end of optical fiber 102 and the top surface of photodiode 104 is shorter, such as 150 μm instead of 160 μm, but the horizontal distance between the end of optical fiber 102 and exposed portion of photodiode 104 is unchanged, then the total height of tapered light coupler 100 would be reduced by 10 μm with adjustable parameter 160. Notably, in this example, if the angle at junction 120 is obtuse, the lengths of both first portion 114 and second portion 116 would be reduced to maintain the same angle.

Using tapered light coupler 100, about 95% light coupling efficiency is possible between the latest generation of MMF and a 10-μm diameter exposed area of photodiode 104, which is a 2-2.5× demagnification improvement over existing technology. As capacitance scales as the square of photodiode 104 diameter, our invention facilitates roughly 4× increase in bandwidth. This bandwidth improvement is obtained without sacrificing light coupling efficiency, possibly even increasing it because existing lens-based MMF coupling strategies often suffer from lack of cost-effective antireflection coatings for both optical fiber 102 and photodiode 104. The polymer of tapered light coupler 100 already enjoys a refractive index which is quite close to that of fiber core 106, so the only antireflection coat to consider here is atop photodiode 104.

Figure 3:
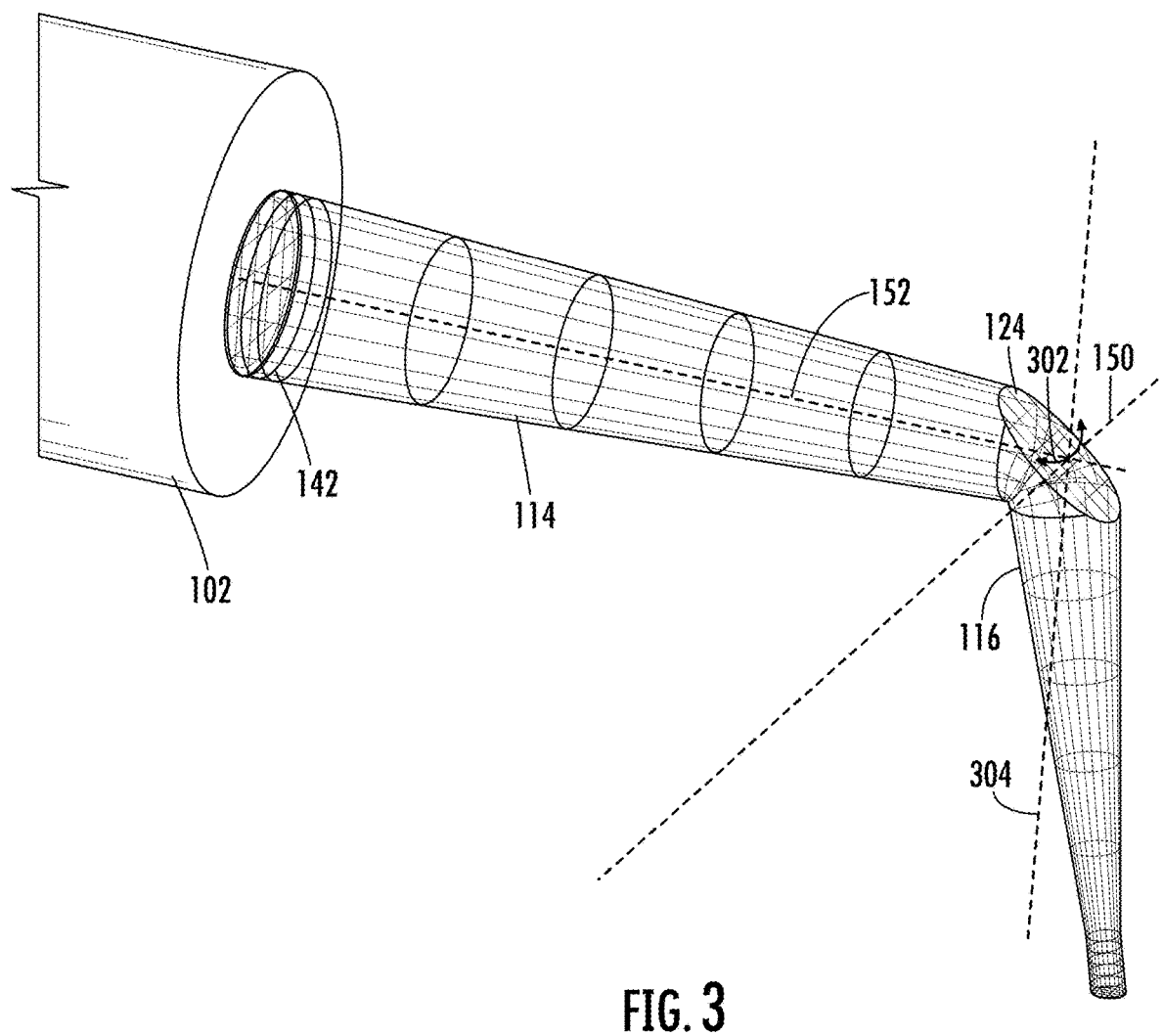
FIG. 3 is a transparent view of a tapered light coupler.

FIG. 3 is a transparent view of an example aspect of tapered light coupler 100. In this example, hip 142 in first portion 114 has a 55 μm diameter to match a diameter of fiber core in optical fiber 102 and the angle between first portion axis 152 and second portion axis 154 (shown in FIG. 1) is 100°. Slanted surface normal vector 150 is biased 0.75° toward second portion 116. Rather than having a flat surface, slanted surface 124 in this example is curved. In this example, slanted surface 124 has a 190 μm radius of curvature 302 with the curve being in a plane perpendicular to first portion axis 152. Specifically, curvature 302 occurs in a plane that is perpendicular to the axes plane containing first portion axis 152, second portion axis 154, and slanted surface normal vector 150. In other aspects of the described subject matter, slanted surface 124 can have radius of curvature 302 less than or greater than 190 μm. As a reference, a perfect vertical axis 304 is shown in FIG. 3, which would be second portion axis 154 if the angle between first portion axis 152 and the second portion axis 154 were 90°.

Figure 4A:
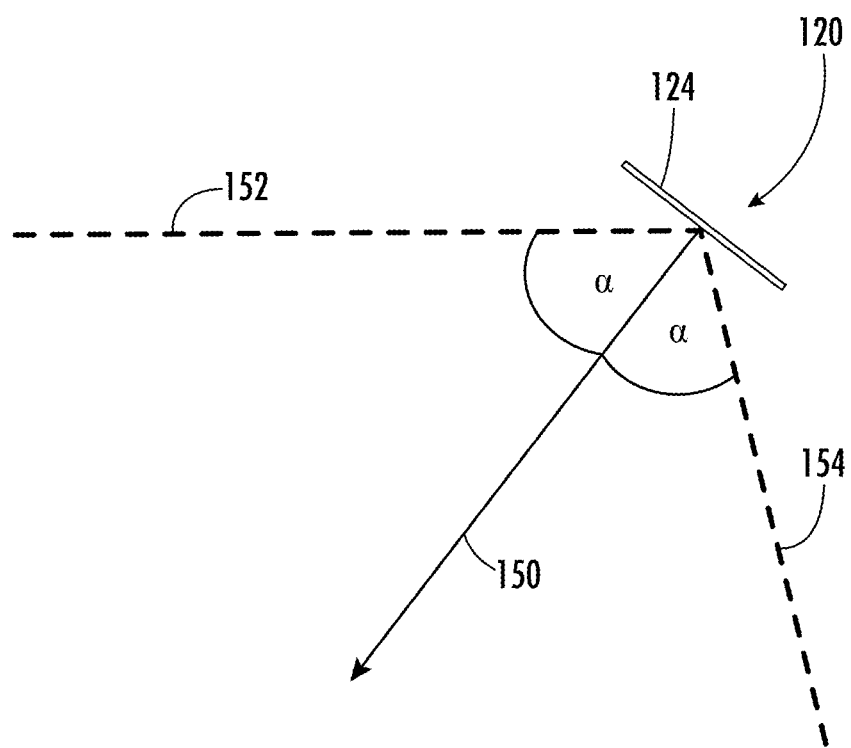
FIG. 4A shows an example orientation of a slanted surface.

FIG. 4A shows an example orientation of slanted surface 124, wherein slanted surface normal vector 150 bisects the angle formed at junction 120 such that angle α formed by the slanted surface normal vector 150 and first portion axis 152 is equal to the angle formed by the slanted surface normal vector 150 and second portion axis 154. For example, in an aspect where the angle between first portion axis 152 and second portion axis 154 is 100°, a is 50°. FIG. 4B shows another example orientation of slanted surface 124, wherein the orientation of the slanted surface 124 is biased toward second portion axis 154 by a. Thus, the angle between slanted surface normal vector 150 and first portion axis 152 is α+δ and the angle between the slanted surface normal vector 150 and second portion axis 154 is α−δ, wherein δ is 0.75°. In other aspects of the described subject matter, δ can be an angle within a range greater than zero and less than 1°, between 1° and 2°, inclusively, or greater than 2°.

FIG. 5A shows an example position of slanted surface 124, wherein first portion axis 152 and second portion axis 154 intersect each other at the slanted surface 124. FIG. 5B shows an example position of slanted surface 124, wherein first portion axis 152 and second portion axis 154 pass through the slanted surface 124 before intersecting and intersect each other past the slanted surface 124 at ε distance & from the slanted surface 124. In an example aspect, ε can be 0.41 microns. In other aspects, & can be less than or larger than 0.41 microns.

Figure 6:
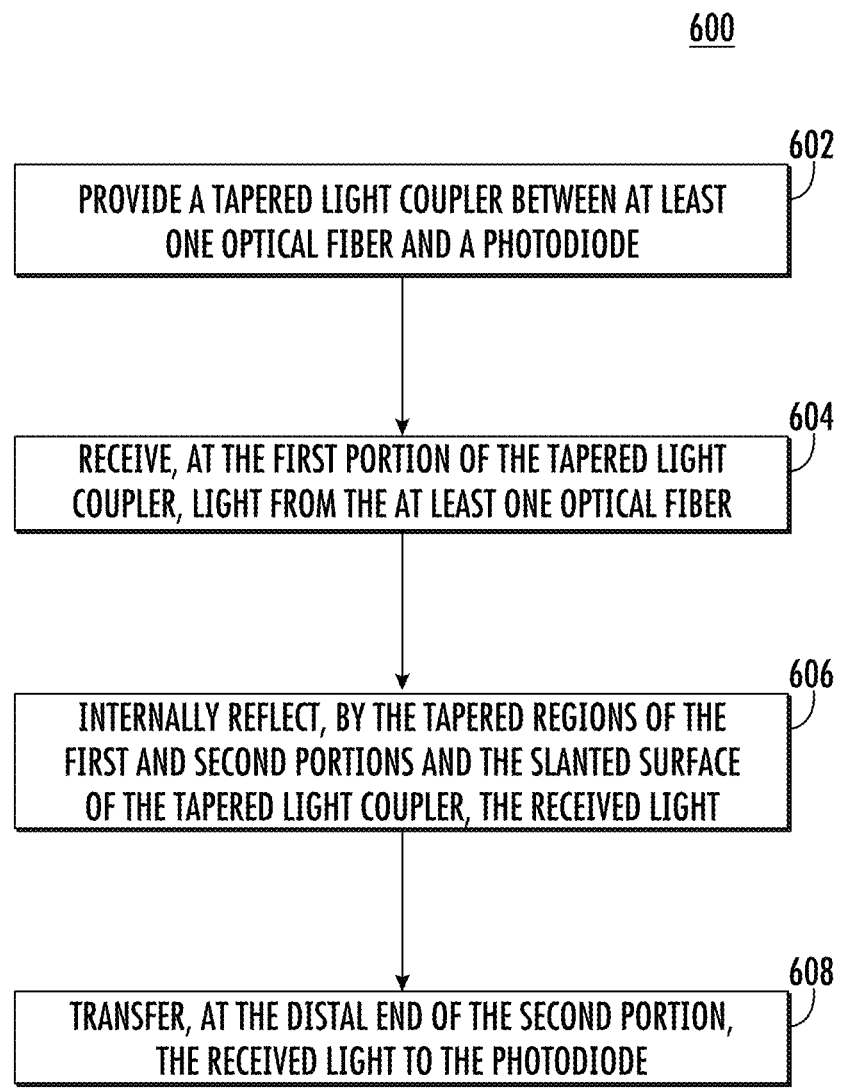
FIG. 6 is a flow diagram illustrating an example method for providing a conduit for light to travel between an optical fiber and a photodiode.

FIG. 6 is a flow diagram illustrating an example method 600 for providing a conduit for light to travel between an optical fiber and a photodiode. At step 602, a tapered light coupler between at least one optical fiber and a photodiode is provided. The tapered light coupler includes a first portion configured to receive light from the at least one optical fiber, the first portion comprising a tapered region that is tapered toward a tapered end. The tapered light coupler further includes a second portion coupled to and extending from the tapered end of the first portion at a junction forming an ordinary angle, the second portion comprising a tapered region that is tapered toward a distal end, the second portion configured to transfer light to the photodiode from the distal end, wherein the photodiode comprises a smaller surface area than a cross sectional area of the at least one optical fiber. The tapered regions of the first and second portions can be conical frusta. The ordinary angle can be about 90°. The ordinary angle can be an obtuse angle within a range to about 100°. The tapered light coupler also includes a slanted surface at an exterior of the junction. The slanted surface can be a chamfer plane, such as a chamfer plane of a torus, or a fillet.

At step 604, light from the at least one optical fiber is received at the first portion. The first portion can be coupled to the at least one optical fiber. The at least one optical fiber can include a multimode fiber.

At step 606, the received light is internally reflected by the tapered regions of the first and second portions and the slanted surface. The tapered regions of the first and second portions and the slanted surface can provide approximately total internal reflection for light received from the at least one optical fiber.

At step 608, the received light is transferred at the distal end of the second portion to the photodiode. The second portion can be coupled to the photodiode.

It will be appreciated that method 600 is for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A device for providing a conduit for light to travel between an optical fiber and a photodiode, the system comprising:
    a tapered light coupler comprising:
        a first portion configured to receive light from at least one optical fiber, the first portion comprising a tapered region that is tapered toward a tapered end;
        a second portion coupled to and extending from the tapered end of the first portion at a junction forming an ordinary angle, the second portion comprising a tapered region that is tapered toward a distal end, the second portion configured to transfer light to a photodiode from the distal end, wherein the photodiode comprises a smaller surface area than a cross sectional area of the at least one optical fiber; and
        a slanted surface at an exterior of the junction.

2. The device of claim 1 wherein the ordinary angle is about 90°.

3. The device of claim 1 wherein the ordinary angle is an obtuse angle within a range to about 100°.

4. The device of claim 1 wherein the slanted surface is a chamfer plane.

5. The device of claim 4 wherein the chamfer plane is a chamfer plane of a torus.

6. The device of claim 1 wherein the slanted surface is a fillet.

7. The device of claim 1 wherein the tapered regions of the first and second portions are conical frusta.

8. The device of claim 1 wherein the at least one optical fiber comprises a multimode fiber.

9. The device of claim 1 wherein the tapered regions of the first and second portions and the slanted surface provide approximately total internal reflection for light received from the at least one optical fiber.

10. The device of claim 1 wherein the first portion is coupled to the at least one optical fiber and the second portion is coupled to the photodiode.

11. A method for providing a conduit for light to travel between an optical fiber and a photodiode, the method comprising:
    providing a tapered light coupler between at least one optical fiber and a photodiode, the tapered light coupler comprising:
        a first portion configured to receive light from the at least one optical fiber, the first portion comprising a tapered region that is tapered toward a tapered end;
        a second portion coupled to and extending from the tapered end of the first portion at a junction forming an ordinary angle, the second portion comprising a tapered region that is tapered toward a distal end, the second portion configured to transfer light to the photodiode from the distal end, wherein the photodiode comprises a smaller surface area than a cross sectional area of the at least one optical fiber; and
        a slanted surface at an exterior of the junction; receiving, at the first portion, light from the at least one optical fiber;
    internally reflecting, by the tapered regions of the first and second portions and the slanted surface, the received light; and
    transferring, at the distal end of the second portion, the received light to the photodiode.

12. The method of claim 11 wherein the ordinary angle is about 90°.

13. The method of claim 11 wherein the ordinary angle is an obtuse angle within a range to about 100°.

14. The method of claim 11 wherein the slanted surface is a chamfer plane.

15. The method of claim 14 wherein the chamfer plane is a chamfer plane of a torus.

16. The method of claim 11 wherein the slanted surface is a fillet.

17. The method of claim 11 wherein the tapered regions of the first and second portions are conical frusta.

18. The method of claim 11 wherein the at least one optical fiber comprises a multimode fiber.

19. The method of claim 11 wherein the tapered regions of the first and second portions and the slanted surface provide approximately total internal reflection for light received from the at least one optical fiber.

20. The method of claim 11 wherein the first portion is coupled to the at least one optical fiber and the second portion is coupled to the photodiode.

* * * * *